United States Patent
Yin

(10) Patent No.: US 12,008,448 B2
(45) Date of Patent: *Jun. 11, 2024

(54) DOCUMENTATION FILE-EMBEDDED MACHINE LEARNING MODELS

(71) Applicant: AT&T Intellectual Property I, L.P., Atlanta, GA (US)

(72) Inventor: Changchuan Yin, Hoffman Estates, IL (US)

(73) Assignee: AT&T Intellect al P Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/183,120

(22) Filed: Mar. 13, 2023

(65) Prior Publication Data

US 2023/0222389 A1    Jul. 13, 2023

Related U.S. Application Data

(63) Continuation of application No. 16/519,914, filed on Jul. 23, 2019, now Pat. No. 11,605,020.

(51) Int. Cl.
  G06F 40/103    (2020.01)
  G06N 20/00    (2019.01)
(52) U.S. Cl.
  CPC ........... G06N 20/00 (2019.01); G06F 40/103 (2020.01)
(58) Field of Classification Search
  CPC .............................. G06N 20/00; G06F 40/103
  See application file for complete search history.

(56) References Cited

U.S. PATENT DOCUMENTS

| | | |
|---|---|---|
| 10,417,184 B1 | 9/2019 | Long |
| 2004/0103105 A1 | 5/2004 | Lindblad et al. |
| 2018/0121574 A1 | 5/2018 | Srinivasan et al. |
| 2019/0018870 A1 | 1/2019 | Bhagwat et al. |

OTHER PUBLICATIONS

"Python 3 Notes: Pickling", www.pitt.edu/~naraehan/python3/pickling.html, retrieved on May 6, 2019, consists of 2 pages.
"How to Pickle: A Beginner's Guide to Pickling and Unpickling Tutorial", www.pythoncentral.io/how-to-pickle-unpickle-tutorial/, Jul. 21, 2017, consists of 4 pages.
"Appending One File to Another File", https://docs.microsoft.com/en-us/windows/win32/fileio/appending-one-file-to-another-file, May 30, 2018, consists of 3 pages.

(Continued)

*Primary Examiner* — Kyle R Stork

(57) ABSTRACT

A processing system including at least one processor may obtain a machine learning model, serialize the machine learning model into a serialized format, and embed a delimiter indicator into a documentation file comprising information regarding the use of the machine learning model, where the delimiter indicator is in a file position that is after an end-of-file indicator of the documentation file. The processing system may further embed the machine learning model in the serialized format into the documentation file in a file position that is after the delimiter indicator. The processing system may then store the documentation file with the delimiter indicator and the machine learning model in the serialized format that are embedded.

20 Claims, 4 Drawing Sheets

(56) References Cited

OTHER PUBLICATIONS

"Saving a machine learning Model", https://www.geeksforgeeks.org/saving-a-machine-learning-model/, retrieved May 6, 2019, consists of 6 pages.

"Reading and Writing to text files in Python", https://www.geeksforgeeks.org/reading-writing-text-files-python/, retrieved May 6, 2019, consists of 8 pages.

"Understanding Python Pickling with example", https://www.geeksforgeeks.org/reading-writing-text-files-python/, retrieved May 6, 2019, consists of 5 pages.

"End-of-file", https://en.wikipedia.org/wiki/End-of-file, Wikipedia, retrieved Jul. 12, 2019, consists of 2 pages.

"4.2.2.1 Appending Files to an Archive", https://www.gnu.org/software/tar/manual/html_node/appending-files.html, Feb. 23, 2019, consists of 1 page.

DOCUMENTATION FILE-EMBEDDED MACHINE LEARNING MODELS

This application is a continuation of U.S. patent application Ser. No. 16/519,914, filed on Jul. 23, 2019, now U.S. Pat. No. 11,605,020, which is herein incorporated by reference in its entirety.

The present disclosure relates generally to machine learning model storage and access, and more particularly to methods, computer-readable media, and apparatuses for embedding a machine learning model in a serialized format into a documentation file in a file position that is after a delimiter indicator. The present disclosure also relates to methods, computer-readable media, and apparatuses for extracting a machine learning model in a serialized format from a documentation file in accordance with a delimiter indicator.

BACKGROUND

Machine learning is an important technology for a wide range of commercial uses, from image recognition to natural language understanding. A key aspect of machine learning is machine learning models, which are stored, deployed, and used for data predictions and queries. Therefore, machine learning models are important components in any machine learning system and play a fundamental role in business data analytics. Many machine learning models are also reusable and adaptable to a wide variety of tasks relating to transportation systems, healthcare, telecommunication network operations, finance, and so forth. Thus, to facilitate collaboration, reuse, and further development, machine learning models may be stored and made publicly available through various network-accessible repositories.

SUMMARY

In one example, the present disclosure describes a method, computer-readable medium, and apparatus for embedding a machine learning model in a serialized format into a documentation file in a file position that is after a delimiter indicator. For instance, in one example, a processing system including at least one processor may obtain a machine learning model, serialize the machine learning model into a serialized format, and embed a delimiter indicator into a documentation file comprising information regarding the use of the machine learning model. In one example, the delimiter indicator is embedded in a file position that is after an end-of-file indicator of the documentation file. The processing system may further embed the machine learning model in the serialized format into the documentation file in a file position that is after the delimiter indicator. The processing system may also store the documentation file with the delimiter indicator and the machine learning model in the serialized format that are embedded.

In another example, the present disclosure describes a method, computer-readable medium, and apparatus for extracting a machine learning model in a serialized format from a documentation file in accordance with a delimiter indicator. For instance, in one example, a processing system including at least one processor may obtain a documentation file comprising information regarding the use of a machine learning model. The documentation file may be in a byte array format and may include a delimiter indicator that is embedded, where the delimiter indicator in a file position that is after an end-of-file indicator of the documentation file. In one example, the machine learning model is embedded in the documentation file and is in a serialized format. In addition, in one example, the machine learning model is in a file position of the documentation file that is after the delimiter indicator. The processing system may further determine the file position of the delimiter indicator and extract the machine learning model in the serialized format from the documentation file in accordance with the delimiter indicator. The processing system may then store the machine learning model that is extracted in a separate file from the documentation file.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
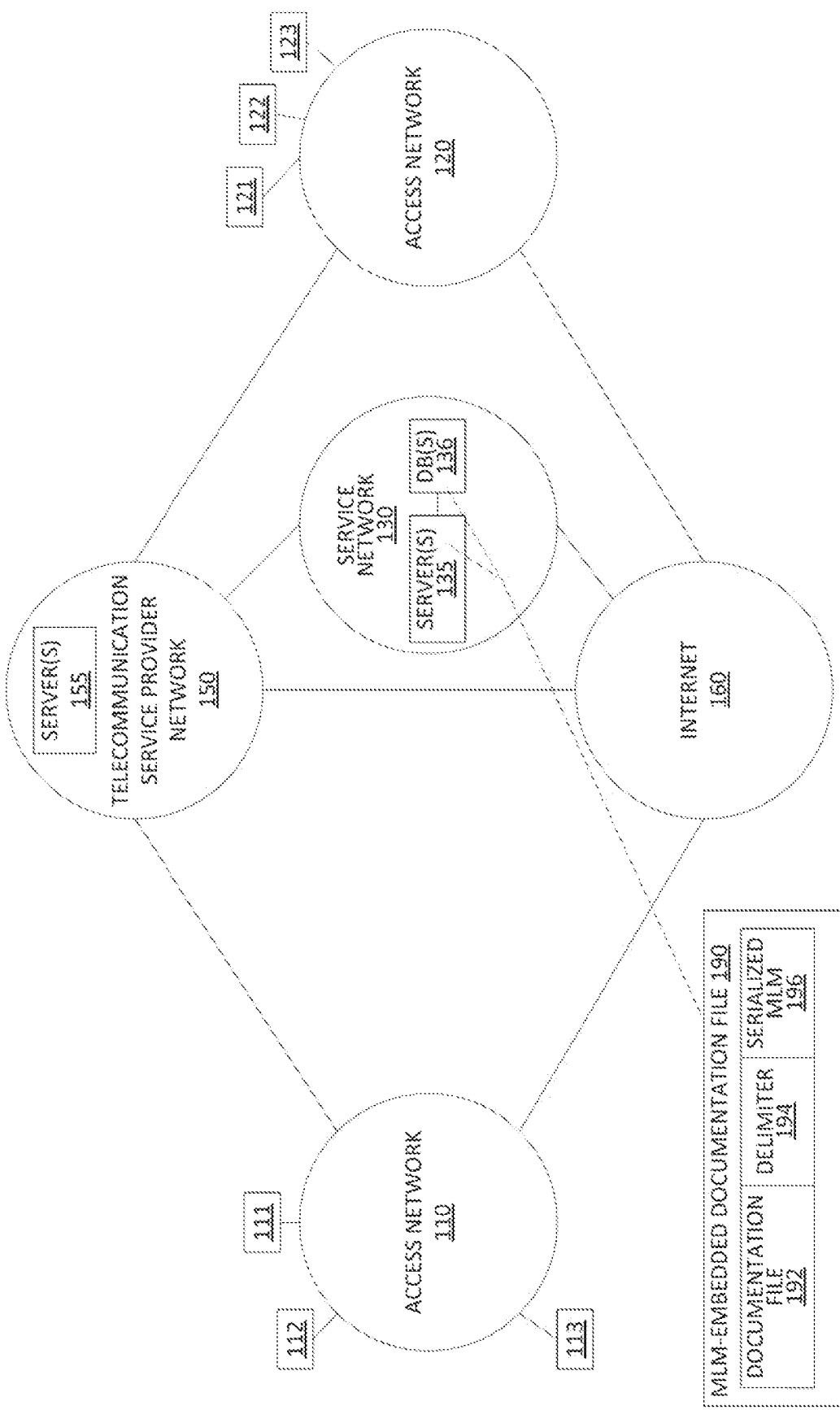
FIG. 1 illustrates one example of a system related to the present disclosure.

The present disclosure broadly discloses methods, non-transitory (i.e., tangible or physical) computer-readable storage media, and apparatus for embedding a machine learning model in a serialized format into a documentation file in a file position that is after a delimiter indicator. The present disclosure also broadly discloses methods, non-transitory (i.e., tangible or physical) computer-readable storage media, and apparatus for extracting a machine learning model in a serialized format from a documentation file in accordance with a delimiter indicator. To use, search, and deploy machine learning models (MLMs), the MLMs may first be stored and then later recovered for use in prediction tasks. MLMs can be stored as serialized objects. In particular, an MLM may be transformed into a serialized format that can be stored as a file and that can be deserialized into the original object from the serialized format. In many instances, an MLM may only be used in the same machine learning platform in which the MLM is created.

Thus, a challenge in MLM portability is that an MLM often cannot be seamlessly used. To use an MLM for prediction tasks, a user may need to know essential facts and use cases of the MLM, for example: what machine learning algorithm is used, how the predictor, which is created by the model, is called, the correct data format in the predictor, how to preprocess the data before calling the predictor, and so forth. In addition, instructions, documentation, or code snippets of the MLM may be important for successful prediction application using the MLM. However, since a serialized MLM object may not carry instructions, documentation, examples, and so forth (broadly "information regarding the use of the MLM"), the information regarding the use of the MLM instructions and the MLM object itself are disconnected. As such, users of the MLM may lack important information about the MLM and may not be able to effectively utilize the MLM in prediction tasks. For example, when an MLM is trained using a particular machine learning platform, it may be necessary that the same version of the platform be used for deploying the MLM for prediction tasks. However, if information regarding this requirement is not provided to users along with the MLM itself, some users may utilize a different machine learning platform, or the wrong platform, which may cause predictions to fail or to be inaccurate, or an application in which the MLM is deployed may simply fail to work or perform poorly. Therefore, deploying and effectively using an MLM may require extensive expertise and core best practices. In addition, since an MLM is generally not accompanied by documentation, the MLM may not easily be indexed and searched from MLM catalogs.

Examples of the present disclosure provide for documentation file-based transformation and storage of MLMs. For instance, in one example, an MLM is serialized into a serialized MLM object (also referred to a "serialized MLM" or an "MLM that is serialized"). The serialized MLM may then be embedded into a documentation file, such as an Adobe Portable Document Format (PDF) document, a Microsoft Word document, or other document or text file, an image file, a video file, and so forth. The embedded serialized MLM can be fully recovered from the documentation file for deployment and use in prediction tasks. The MLM-embedded documentation file is not changed for file type and contents, and therefore can be stored, and communicated through different applications. The MLM-embedded documentation file may contain information regarding the usage of the MLM, such as the background and detailed usage instructions for the MLM. The documentation file may also contain metadata about the MLM for querying and indexing of the MLM in one or more MLM catalogs. Examples of the present disclosure, therefore, streamline storing, searching, and deploying of MLMs.

In accordance with the present disclosure, there are three components to an MLM-embedded documentation file: (1) the documentation file content, comprising the information regarding the use of the MLM, (2) a delimiter, which is used as boundary between the document file content and the serialized MLM, and (3) the serialized MLM. Information regarding the use of MLM is important for successfully deploying the MLM for prediction tasks. The information regarding the use of the MLM that is contained with the content of the documentation file may include: delimiter text (e.g., a text code associated with a bit (or byte) sequence comprising the delimiter), the MLM structures, optimal parameters, optional parameters, input data format(s), code snippets for the predictor, and/or any other related information about the MLM. In one example, the documentation file type may be PDF A/B, which can archive digital information for long periods. However, in other examples, the documentation file may be a word processing document (e.g., a Microsoft® Word document, or the like), an image file, a video file, and so forth. As stated above, the properties of the MLM may also be added into metadata of the documentation file as key words and description. Therefore, the properties in the metadata of the document file may be used for indexing and searching for the MLM in MLM catalogs.

The delimiter is used to separate the documentation file content and the (serialized) MLM. In one example, the delimiter may comprise a bit/byte sequence. In one example, the delimiter is associated with and identified by a delimiter text. In addition, in one example, the delimiter text may be recorded in the documentation file content such that it may be easily recovered by users of the MLM. For instance, the delimiter text may be an email address of an owner or creator of the MLM, a company name, etc. The delimiter text may then be used to identify the delimiter as a bit/byte sequence. For instance, the delimiter may be derived by ASCII text to binary conversion, or the like.

When an MLM is trained and generated from a given input data set in accordance with one or more machine learning algorithms (MLAs) and a machine learning platform, the MLM may be serialized into a serialized object (a "serialized MLM) using language-specific utilities. For example, in Python, "pickle" or hd5py may serialize an MLM into a serialized object; in C++ v. 11, the "cereal" utility may perform the same function. The serialized MLM may comprise a byte sequence, or byte array, and can be saved and retrieved as a portable file. The serialized MLM can also be deserialized using the same language utilities, allowing the original MLM to be recovered by various users and reused in various prediction tasks.

In one example, the present disclosure first appends the delimiter as a byte sequence/array to the byte sequence/array comprising the documentation file contents, and then pads the serialized MLM (also comprising a byte sequence/array) starting in a file position after the delimiter. The joined three blocks of byte sequences/arrays is saved as file (broadly "an MLM-embedded documentation file"), having a structure of: documentation file contents/delimiter/serialized MLM. The documentation file before and after embedding the MLM retains the same file type and contents (e.g., the same text, images, video, etc.). Accordingly, the MLM-embedded documentation file is readable as the original file type. For example, if the documentation file is a PDF file, the transformed MLM-embedded documentation file is still a PDF file, and the content can be read. In one example, the end of the documentation file contents may be indicated by an end-of-file (EoF) indicator, such as a bit/byte sequence representing "CTRL-Z" or the like. In particular, the EoF indicator may be recognized by the application used to interact with the documentation file, such as Microsoft Word or another word processing application, Adobe PDF Reader or another PDF reader, editor, or the like, a video player application, and so on. However, it should be noted that the file system may allocate more memory and/or storage to the documentation file than is necessary for the documentation file contents. As such, an MLM-embedded documentation file may contain the delimiter and serialized MLM beyond the EoF indicator that may be recognized and utilized by the application to open and interact with the documentation file (i.e., the documentation file contents). In other words, the application may ignore any portions of the MLM-embedded documentation file which are after the EoF indicator.

In addition, the original MLM can be fully recovered from the MLM-embedded documentation file and retains the original structure and function(s) as originally trained before serialization and storage/embedding in the documentation file. To illustrate, the MLM may be recovered from the MLM-embedded documentation file as a byte sequence/array by extracting the bytes starting from the delimiter end position to the end of the MLM-embedded documentation file. As mentioned above, the MLM-embedded documentation file may be allocated and may comprise more memory and/or storage than required for the documentation file contents. In addition, an EoF indicator may be recognized and utilized by an application via which the documentation file is opened and interacted with. However, in accordance with the present disclosure, a processing system comprising one or more processors (e.g., a user endpoint device, a cloud-based desktop, server, cluster, or the like, a platform, e.g., a machine learning platform hosted on one or more of such devices, and so forth) may access the full contents of MLM-embedded documentation file. For instance, the MLM-embedded documentation file may have a structure of: documentation file content (e.g., comprising text content, PDF content, image(s), video, etc.), followed by the delimiter, followed by the serialized MLM. For illustrative purposes, the entire MLM-embedded documentation file may be allocated and may comprise 9.01 MB, of which 3 MB may comprise the documentation file content (e.g., the informational content regarding the use of the MLM), 0.1 KB of which may comprise the delimiter text, and 6 MB of which may comprise the serialized MLM.

In one example, the processing system may scan the combined byte sequence/array of the documentation file content/delimiter/serialized MLM looking for the delimiter byte sequence. In addition, the processing system may ignore the EoF indicator (if present) signifying the end of the documentation file contents. In one example, the documentation file contents may include metadata indicating the delimiter text and/or the delimiter byte sequence. In one example, metadata of the documentation file may include the exact and/or approximate size of the documentation file contents. As such, the processing system may begin scanning for the delimiter at some intermediate position of the combined byte sequence of the MLM-embedded documentation file (e.g., rather than starting the scan from the beginning of the documentation file contents).

In one example, the MLM-embedded documentation file may also be padded to the end of the allocated storage/memory units. For instance, if the MLM-embedded documentation file is allocated and comprises 10 MB, and the documentation file contents, the delimiter, and the serialized MLM have the same sizes/lengths noted above, the MLM-embedded documentation file may be end-padded with approximately 0.99 MB. In addition, in such an example, an additional indicator may be included to indicate the end of the serialized MLM byte sequence/array (such as another EoF indicator, e.g., CTRL-Z, a custom indicator, such as one similar to the delimiter, and so forth).

In any case, after recovering the serialized MLM, the serialized MLM may be separately stored as a serialized MLM object/file. In addition, the serialized MLM may be deserialized for deployment and use in a prediction task. For instance, reverse pickling may be performed via any of the utilities mentioned above, or the like. It should again be noted that the transformation and recovery of an MLM do not change the MLM structure and functions. Moreover, the techniques described herein have been validated using actual MLMs and documentation files comprising .pdf files, image files, and text files.

As referred to herein, a machine learning model (MLM) (or machine learning-based model) may comprise a machine learning algorithm (MLA) that has been "trained" or configured in accordance with input data (e.g., training data) to perform a particular service. As also referred to herein an MLM may refer to an untrained MLM (e.g., an MLA that is ready to be trained in accordance with appropriately formatted data). Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth. These and other aspects of the present disclosure are discussed in greater detail below in connection with the examples of FIGS. 1-4.

To aid in understanding the present disclosure, FIG. 1 illustrates an example system 100 comprising a plurality of different networks in which examples of the present disclosure for embedding a machine learning model in a serialized format into a documentation file in a file position that is after a delimiter indicator and/or for extracting a machine learning model in a serialized format from a documentation file in accordance with a delimiter indicator may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing system, such as computing system 400 depicted in FIG. 4, and may be configured to host one or more centralized system components in accordance with the present disclosure. For example, a first centralized system component may comprise a database of assigned telephone numbers, a second centralized system component may comprise a database of basic customer account information for all or a portion of the customers/subscribers of the telecommunication service provider network 150, a third centralized system component may comprise a cellular network service home location register (HLR), e.g., with current serving base station information of various subscribers, and so forth. Other centralized system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other centralized system components may include, for example, a layer 3 router, a short message service (SMS) server, a voicemail server, a video-on-demand server, a server for network traffic analysis, and so forth. It should be noted that in one example, a centralized system component may be hosted on a single server, while in another example, a centralized system component may be hosted on multiple servers, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user devices and/or one or more servers of one or more data set owners, such as a weather data service, a traffic management service (such as a state or local transportation authority, a toll collection service, etc.), a payment processing service (e.g., a credit card company, a retailer, etc.), a police, fire, or emergency medical service, and so on. In addition, any one or more of endpoint devices 111-113 and 121-123 may represent one or more user devices and/or one or more servers of one or more MLM owners and/or MLM creators. The MLMs may be generated and trained in accordance with any machine learning algorithms (MLAs) and in accordance with any of the data sets of any data set owners, e.g., weather data, traffic data, financial/payment data, communication network management and performance data, etc.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide service network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed. In another example, service network 130 may represent a third-party network, e.g., a network of an entity that provides a service for executing an operations set associated with a database system in accordance with approvals from a plurality of data set owners, in accordance with the present disclosure.

In the example of FIG. 1, service network 130 may include one or more servers 135 which may each comprise all or a portion of a computing device or system, such as computing system 400, and/or processing system 402 as described in connection with FIG. 4 below, specifically configured to perform various steps, functions, and/or operations for embedding a machine learning model in a serialized format into a documentation file in a file position that is after a delimiter indicator and/or for extracting a machine learning model in a serialized format from a documentation file in accordance with a delimiter indicator, as described herein. For example, one of the server(s) 135, or a plurality of servers 135 collectively, may perform operations in connection with the example method 200 and/or the example method 300, or as otherwise described herein. In one example, the one or more of the servers 135 may comprise an MLM platform (e.g., a network-based and/or cloud-based service hosted on the hardware of servers 135). In addition, in one example, the one or more of the servers 135 may alternatively or additionally comprise an MLM catalog providing an indexing and searching interface via which MLMs and associated documentation may be uploaded and/or obtained by various devices 111-113, 121-123, etc., (e.g., via MLM-embedded documentation files as described herein), and so forth.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for embedding a machine learning model in a serialized format into a documentation file in a file position that is after a delimiter indicator and/or for extracting a machine learning model in a serialized format from a documentation file in accordance with a delimiter indicator, as described herein. As just one example, DB(s) 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, and other information and statistics, which may then be compiled and processed, e.g., normalized, transformed, tagged, etc., and forwarded to DB(s) 136, via one or more of the servers 135.

Similarly, DB(s) 136 may receive and store weather data from a device of a third-party, e.g., a weather service, a traffic management service, etc. via one of access networks 110 or 120. For instance, one of endpoint devices 111-113 or 121-123 may represent a weather data server (WDS). In one example, the weather data may be received via a weather service data feed, e.g., an NWS extensible markup language (XML) data feed, or the like. In another example, weather data may be obtained by retrieving the weather data from the WDS. In one example, DB(s) 136 may receive and store weather data from multiple third-parties. Similarly, one of endpoint devices 111-113 or 121-123 may represent a server of a traffic management service and may forward various traffic related data to DB(s) 136, such as toll payment data, records of traffic volume estimates, traffic signal timing information, and so forth. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

As mentioned above, any one or more of endpoint devices 111-113 and/or endpoint devices 121-123 may comprise devices of data set owners for uploading and offering data sets for sharing, purchase, lease, download, licensing, etc. via server(s) 135. Alternatively, or in addition, any one or more of endpoint devices 111-113 and 121-123 may represent one or more user devices and/or one or more servers of one or more MLM owners and/or MLM creators. The MLMs may be generated and trained in accordance with any machine learning algorithms (MLAs) and in accordance with any of the data sets of any data set owners, e.g., weather data, traffic data, financial/payment data, communication network management and performance data, etc. In one example, MLMs and documentation files may be uploaded by any one or more of the endpoint devices 111-113 and 121-123 to server(s) 135, where the server(s) 135 may create MLM-embedded documentation files from the components received from the endpoint devices 111-113 and 121-123. An example MLM-embedded documentation file 190 is illustrated in FIG. 1. As can be seen in the FIG. 1, MLM-embedded documentation file 190 includes documentation file content 192 (the informational content), a delimiter 194 (e.g., a byte sequence, which may also be associated with a text code), and lastly a serialized MLM 196 (which also comprises a byte sequence/array). The MLM-embedded documentation files may then be stored in DB(s) 136 and/or provided to any one or more of endpoint devices 111-113 and 121-123 that may request the MLM-embedded documentation files from the server(s) 135. For instance, as mentioned above, the server(s) 135 may host an MLM catalog service (e.g., in conjunction with DB(s) 136).

In another example, endpoint devices 111-113 and 121-123 may create MLM-embedded documentation files and upload the MLM-embedded documentation files to the server(s) 135 for storage in DB(s) 136, where the MLM-embedded documentation files may be retrieved from DB(s) 136 for distribution to one or more of the others of endpoint devices 111-113 and 121-123, and so forth. In this regard, server(s) 135 may maintain communications with one or more of the endpoint devices 111-113 and/or endpoint devices 121-123 via access networks 110 and 120, telecommunication service provider network 150, Internet 160, and so forth. Various additional functions of server(s) 135 in connection with executing an operations set associated with a database system in accordance with approvals from a plurality of data set owners are described in greater detail below in connection with the examples of FIGS. 2 and 3.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. Thus, these and other modifications are all contemplated within the scope of the present disclosure.

Figure 2:
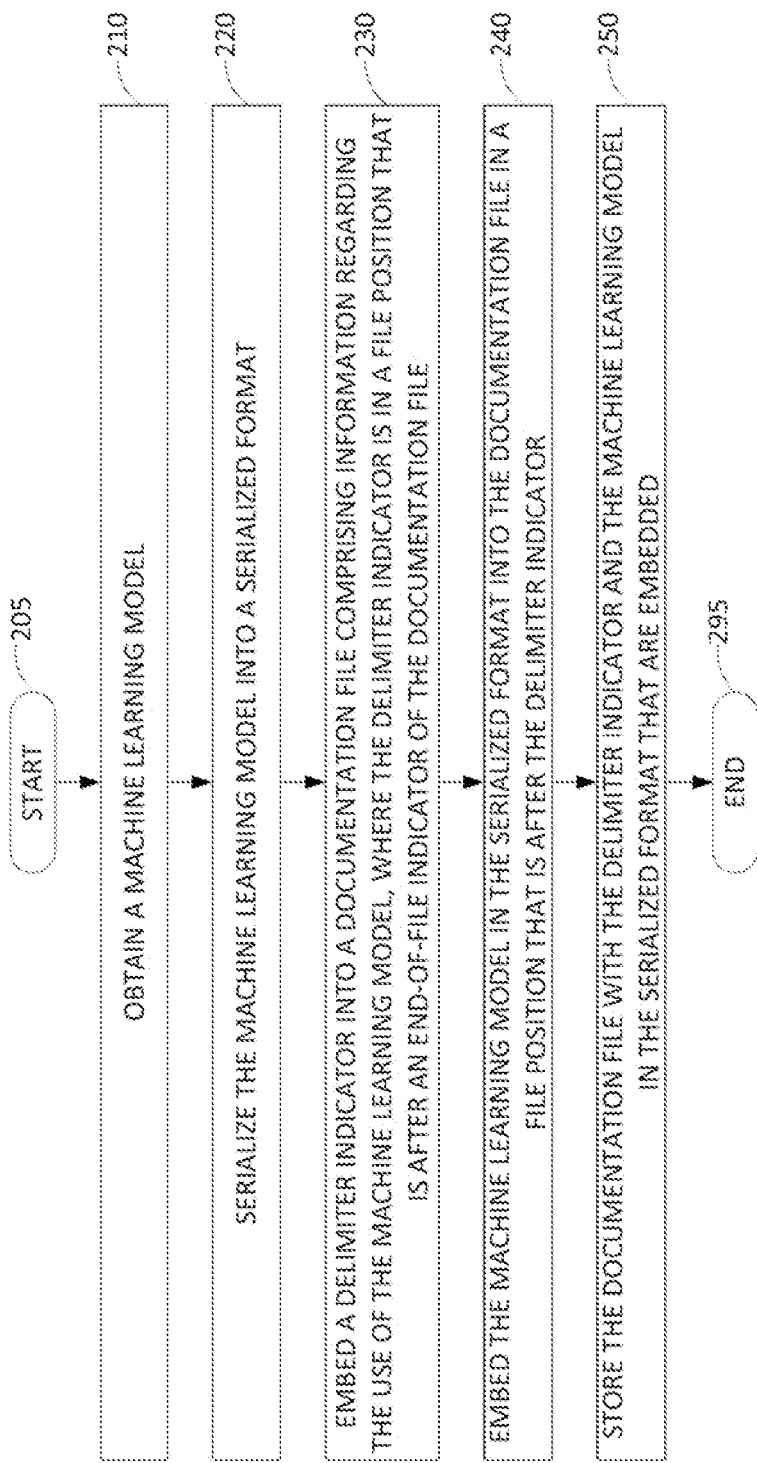
FIG. 2 illustrates an example flowchart of a method for embedding a machine learning model in a serialized format into a documentation file in a file position that is after a delimiter indicator.

FIG. 2 illustrates an example flowchart of a method 200 for embedding a machine learning model in a serialized format into a documentation file in a file position that is after a delimiter indicator. In one example, steps, functions, and/or operations of the method 200 may be performed by a device as illustrated in FIG. 1, e.g., one or more of servers 135, or by one of endpoint devices 111-113 or 121-123. Alternatively, or in addition, the steps, functions and/or operations of the method 200 may be performed by a processing system collectively comprising a plurality of devices as illustrated in FIG. 1 such as one or more of servers 135, DB(s) 136, endpoint devices 111-113 and/or 121-123, and so forth. In one example, the steps, functions, or operations of method 200 may be performed by a computing device or system 400, and/or a processing system 402 as described in connection with FIG. 4 below. For instance, the computing device 400 may represent at least a portion of a platform, a server, a system, and so forth, in accordance with the present disclosure. For illustrative purposes, the method 200 is described in greater detail below in connection with an example performed by a processing system. The method 200 begins in step 205 and proceeds to step 210.

At step 210, the processing system obtains a machine learning model (MLM). The MLM may comprise a trained MLM, or may comprise an untrained MLM (e.g., a MLA that is ready to be trained in accordance with a correctly formatted set of input data).

At step 220, the processing system serializes the MLM into a serialized format, e.g., to create a serialized MLM comprising a byte sequence/array. In one example, step 220 may comprise pickling the MLM using a utility such as "pickle," hd5py, "cereal," or the like.

At step 230, the processing system embeds a delimiter indicator into a documentation file comprising information regarding the use of the MLM. The documentation file may comprise a text document file, e.g., a word processing document, a text file, a pdf file, etc., an image file, a video file, and so forth. Thus, the information regarding the use of the MLM comprises at least one of: text-based information, image-based information, or video-based information. The information regarding the use of the MLM may be accessible via an associated user application.

In addition, in one example, the delimiter indicator may be embedded in a file position that is after an end-of-file (EoF) indicator of the documentation file (e.g., the information content thereof). For instance, the documentation file (e.g., the informational content thereof) may also be in the serialized format. In other words, the documentation file contents may also comprise a byte sequence/array. In addition, the memory and/or storage allocation for an MLM-embedded documentation file may be of a size/length that is greater than that which is necessary for the documentation file contents alone (e.g., a text/word processing document along with associated metadata, a PDF document and associated metadata, image content and associated metadata, video content and associated metadata, etc.). For instance, the documentation file may comprise a byte array, where the EoF indicator is in an intermediate position in the byte array. The delimiter indicator may then be embedded in a file position following the EoF indicator.

In one example, the delimiter indicator is a byte sequence/array that is associated with a text code. In addition, in one example, the text code may be included in a portion of the documentation file that is accessible via a user application. For instance, the text code may be presented in the text of a word processing document, a PDF document, or the like, or may be presented in an image of an image file, may be presented visually or orally in a video program of a video file, etc. Alternatively, or in addition, the text code and/or the delimiter identifier (e.g., a byte sequence/array) may be included in a metadata field of the documentation file.

At step 240, the processing system embeds the MLM in the serialized format into the documentation file in a file position that is after the delimiter indicator.

At step 250, the processing system stores the documentation file with the delimiter indicator and the MLM in the serialized format that are embedded.

Following step 250, the method 200 ends in step 295. It should be noted that the method 200 may be expanded to include additional steps, or may be modified to replace steps with different steps, to combine steps, to omit steps, to perform steps in a different order, and so forth. For instance, in one example, the processing system may repeat one or more steps of the method 200, such as steps 210-250 for another MLM and documentation file, and so on. In another example, step 230 may be performed before step 220. In another example, the method 200 may include training the MLM via a machine learning platform, e.g., in accordance with an MLA and an input data set. In still another example, the method 200 may include obtaining a user input providing the delimiter indicator (e.g., an email address, a name of the MLM creator and/or a corporate owner, etc.). Thus, these and other modifications are all contemplated within the scope of the present disclosure.

Figure 3:
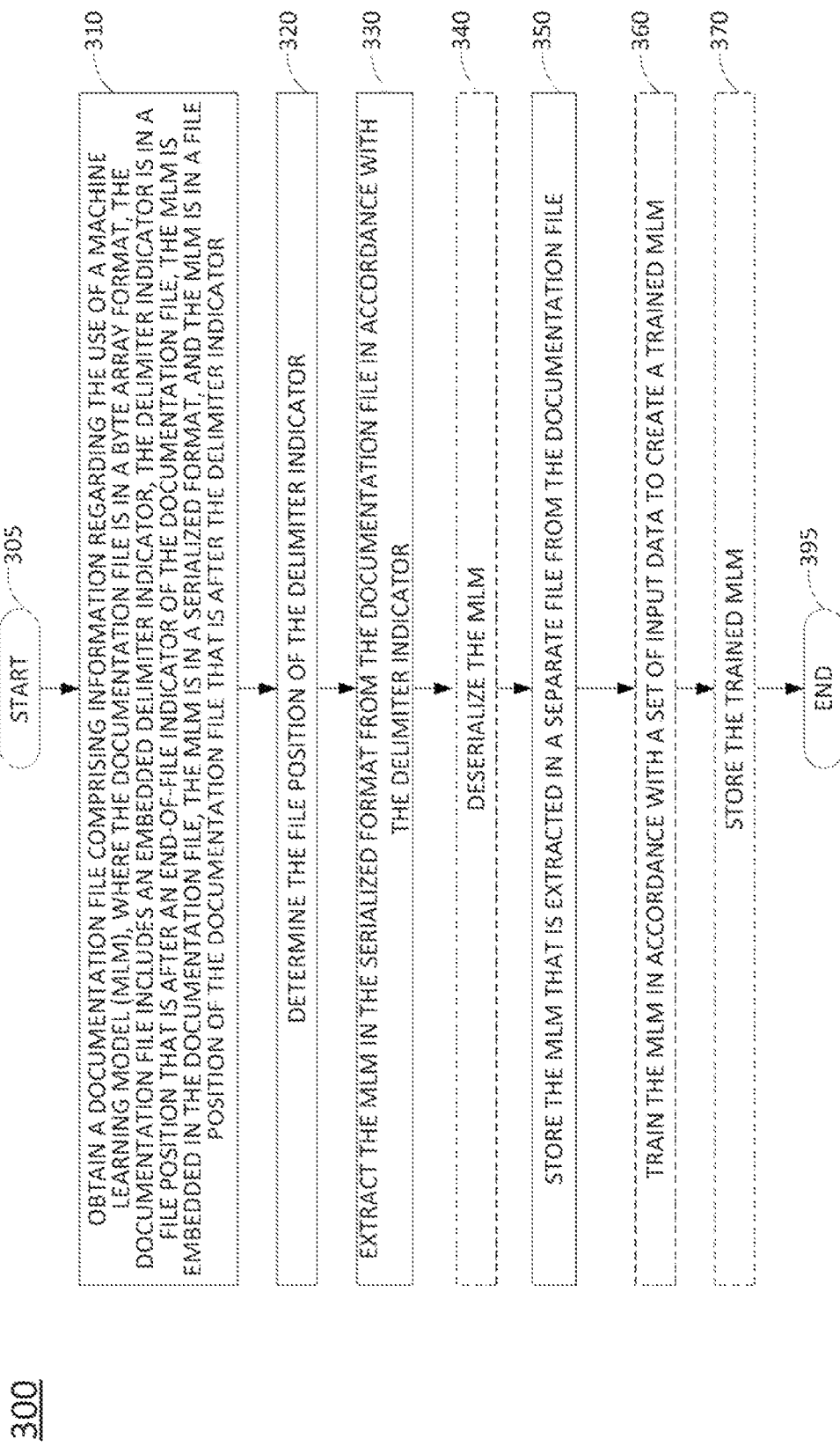
FIG. 3 illustrates an example flowchart of a method for extracting a machine learning model in a serialized format from a documentation file in accordance with a delimiter indicator.

FIG. 3 illustrates an example flowchart of a method 300 for extracting a machine learning model in a serialized format from a documentation file in accordance with a delimiter indicator. In one example, steps, functions, and/or operations of the method 300 may be performed by a device as illustrated in FIG. 1, e.g., one or more of servers 135, or by one of endpoint devices 111-113 or 121-123. Alternatively, or in addition, the steps, functions and/or operations of the method 300 may be performed by a processing system collectively comprising a plurality of devices as illustrated in FIG. 1 such as one or more of servers 135, DB(s) 136, endpoint devices 111-113 and/or 121-123, and so forth. In one example, the steps, functions, or operations of method 300 may be performed by a computing device or system 400, and/or a processing system 402 as described in connection with FIG. 4 below. For instance, the computing device 400 may represent at least a portion of a platform, a server, a system, and so forth, in accordance with the present disclosure. For illustrative purposes, the method 300 is described in greater detail below in connection with an example performed by a processing system. The method 300 begins in step 305 and proceeds to step 310.

At step 310, the processing system obtains a documentation file comprising information regarding the use of a machine learning model (MLM), where the documentation file is in a byte array format, the documentation file includes an embedded delimiter indicator, and the delimiter indicator is in a file position that is after an end-of-file (EoF) indicator of the documentation file. The documentation file obtained at step 310 may further include an embedded MLM (i.e., the MLM for which the documentation file contains information regarding the usage thereof), where the MLM is in a serialized format, and where the MLM is in a file position of the documentation file that is after the delimiter indicator. The MLM may comprise a trained MLM or an untrained MLM, e.g., an MLA that is ready to be trained via a machine learning platform in accordance with a set of input data.

The documentation file may comprise a text document file, e.g., a word processing document, a text file, a pdf file, etc., an image file, a video file, and so forth. Thus, the information regarding the use of the MLM comprises at least one of: text-based information, image-based information, or video-based information. Thus, the information regarding the use of the MLM may be accessible via an associated user application.

In one example, the delimiter indicator is a byte sequence/array that is associated with a text code. In addition, in one example, the text code may be included in a portion of the documentation file that is accessible via a user application. For instance, the text code may be presented in the text of a word processing document, a PDF document, or the like, or may be presented in an image of an image file, may be presented visually or orally in a video program of a video file, etc. Alternatively, or in addition, the text code and/or the delimiter identifier (e.g., a byte sequence/array) may be included in a metadata field of the documentation file.

At step 320, the processing system determines the file position of the delimiter indicator. For example, the processing system may scan the combined byte sequence/array of the documentation file content/delimiter/serialized MLM looking for the delimiter byte sequence. In addition, the processing system may ignore the EoF indicator (if present) signifying the end of the documentation file contents. In one example, the documentation file contents may include metadata indicating the delimiter text and/or the delimiter byte sequence. In one example, the documentation file (e.g., the documentation file metadata) may include the exact and/or approximate size of the documentation file contents. As such, the processing system may begin scanning for the delimiter at some intermediate position of the combined byte sequence of the MLM-embedded documentation file (e.g., rather than starting the scan from the beginning of the documentation file contents).

At step 330, the processing system extracts the MLM in the serialized format from the documentation file in accordance with the delimiter indicator.

At optional step 340, the processing system deserializes the MLM. For instance, the processing system may perform reverse serialization/pickling via any of the utilities mentioned above, such as "pickle," hd5py, "cereal," or the like.

At step 350, the processing system stores the MLM that is extracted in a separate file from the documentation file, e.g., in a serialized or a deserialized format, depending upon whether optional step 340 is performed.

At optional step 360, the processing system may train the MLM in accordance with a set of input data to create a trained MLM, e.g., in an example where the MLM that is embedded in the documentation file obtained at step 310 is untrained. For instance, a user may obtain information regarding the use of the MLM from the contents of the documentation file and may determine the correct formatting of the input data, may determine which machine learning platform, or platforms, may be used for the training and deployment of the MLM, and so forth.

At optional step 370, the processing system may store the trained MLM. The trained MLM may then be retrieved and called at a later time for use in a prediction task.

Following step 350, or any of optional steps 360-370, method 300 ends in step 395. It should be noted that method 300 may be expanded to include additional steps, or may be modified to replace steps with different steps, to combine steps, to omit steps, to perform steps in a different order, and so forth. For instance, in one example, the processing system may repeat one or more steps of the method 300, such as steps 310-350 for additional MLMs, and so on. In another example, the method 300 may include obtaining an input requesting the MLM, an input requesting MLMs associated with a particular search term, and so forth. Thus, the MLM may be obtained at step 310 in response to such an input or inputs. In still another example, the trained MLM of optional steps 360 and 370 may also be embedded in a serialized format in a documentation file. For instance, the MLM trained in accordance with a particular set of input data may be used for a particular purpose that may be specific to a given field or application. Thus, there may be additional and or unique documentation that may be useful to this particular trained MLM (e.g., instead of and/or in addition to more general usage information relating to an untrained MLM that may be extracted from MLM-embedded documentation file obtained at step 310). As such, the method 300 may be expanded to include one or more steps of the method 200 of FIG. 2 with regard to the embedding of an MLM in a documentation file. Thus, these and other modifications are all contemplated within the scope of the present disclosure.

In addition, although not specifically specified, one or more steps, functions, or operations of the method 200 or the method 300 may include a storing, displaying, and/or outputting step as required for a particular application. In other words, any data, records, fields, and/or intermediate results discussed in the method 200 or the method 300 can be stored, displayed and/or outputted either on the device executing the method 200 and/or the method 300, or to another device, as required for a particular application. Furthermore, steps, blocks, functions, or operations in FIGS. 2 and 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 or method 300 may comprise optional steps, or can be combined, separated, and/or performed in a different order from that described above, without departing from the examples of the present disclosure.

Figure 4:
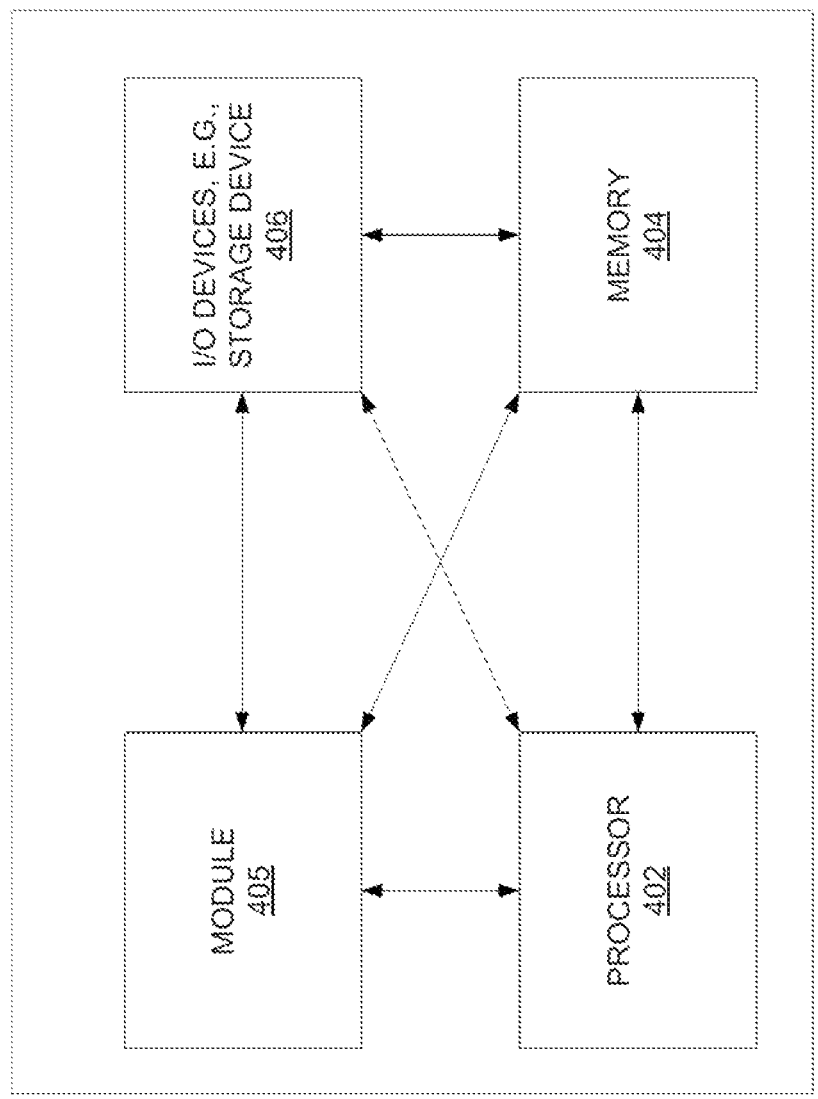
FIG. 4 illustrates a high-level block diagram of a computing device specially programmed to perform the functions described herein.

FIG. 4 depicts a high-level block diagram of a computing device or processing system specifically programmed to perform the functions described herein. For example, any one or more components or devices illustrated in FIG. 1, or described in connection with the method 200 of FIG. 2 or the method 300 of FIG. 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for embedding a machine learning model in a serialized format into a documentation file in a file position that is after a delimiter indicator and/or for extracting a machine learning model in a serialized format from a documentation file in accordance with a delimiter indicator, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in FIG. 4, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 4 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for embedding a machine learning model in a serialized format into a documentation file in a file position that is after a delimiter indicator and/or for extracting a machine learning model in a serialized format from a documentation file in accordance with a delimiter indicator (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for embedding a machine learning model in a serialized format into a documentation file in a file position that is after a delimiter indicator and/or for extracting a machine learning model in a serialized format from a documentation file in accordance with a delimiter indicator (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
obtaining, by a processing system including at least one processor, a documentation file comprising information regarding a use of a machine learning model, wherein the documentation file is in comprises a byte array, wherein the documentation file includes a delimiter indicator that is embedded, wherein the delimiter indicator is in a file position that is after an end-of-file indicator of the documentation file, wherein the end-of-file indicator indicates an end of a documentation file content, wherein the end-of-file indicator is in an intermediate position in the byte array, wherein the machine learning model is embedded in the documentation file, wherein the machine learning model is in a serialized format, and wherein the machine learning model is in a file position of the documentation file that is after the delimiter indicator;
determining, by the processing system, the file position of the delimiter indicator;
extracting, by the processing system, the machine learning model in the serialized format from the documentation file in accordance with the delimiter indicator; and
storing, by the processing system, the machine learning model that is extracted in a separate file from the documentation file.

2. The method of claim 1, wherein the machine learning model comprises:
a trained machine learning model; or
an untrained machine learning model.

3. The method of claim 2, wherein the machine learning model comprises the untrained machine learning model, the method further comprising:
training the untrained machine learning model in accordance with a set of input data to create a newly trained machine learning model; and
storing the newly trained machine learning model.

4. The method of claim 1, wherein the delimiter indicator is a byte sequence that is associated with a text code.

5. The method of claim 4, wherein the text code is included in a portion of the documentation file that is accessible via a user application.

6. The method of claim 5, wherein the text code is included in a metadata field of the documentation file.

7. The method of claim 1, wherein the documentation file comprises:
a text document file;
a portable document format file;
an image file; or
a video file.

8. The method of claim 1, wherein the information regarding the use of the machine learning model is accessible via a user application, wherein the information regarding the use of the machine learning model comprises at least one of:
text-based information;
image-based information; or
video-based information.

9. An apparatus comprising:
a processing system including at least one processor; and
a non-transitory computer-readable storage medium storing instructions which, when executed by the processing system, cause the processing system to perform operations, the operations comprising:
a documentation file comprising information regarding a use of a machine learning model, wherein the documentation file comprises a byte array, wherein the documentation file includes a delimiter indicator that is embedded, wherein the delimiter indicator is in a file position that is after an end-of-file indicator of the documentation file, wherein the end-of-file indicator indicates an end of a documentation file content, wherein the end-of-file indicator is in an intermediate position in the byte array, wherein the machine learning model is embedded in the documentation file, wherein the machine learning model is in a serialized format, and wherein the machine learning model is in a file position of the documentation file that is after the delimiter indicator;

determining the file position of the delimiter indicator;

extracting the machine learning model in the serialized format from the documentation file in accordance with the delimiter indicator; and storing the machine learning model that is extracted in a separate file from the documentation file.

10. The apparatus of claim 9, wherein the machine learning model comprises:

a trained machine learning model; or an untrained machine learning model.

11. The apparatus of claim 10, wherein the machine learning model comprises the untrained machine learning model, the operations further comprising:

training the untrained machine learning model in accordance with a set of input data to create a newly trained machine learning model; and storing the newly trained machine learning model.

12. The apparatus of claim 9, wherein the delimiter indicator is a byte sequence that is associated with a text code.

13. The apparatus of claim 12, wherein the text code is included in a portion of the documentation file that is accessible via a user application.

14. The apparatus of claim 13, wherein the text code is included in a metadata field of the documentation file.

15. The apparatus of claim 9, wherein the documentation file comprises:

a text document file;

a portable document format file;

an image file; or a video file.

16. The apparatus of claim 9, wherein the information regarding the use of the machine learning model is accessible via a user application, wherein the information regarding the use of the machine learning model comprises at least one of:

text-based information;

image-based information; or video-based information.

17. A non-transitory computer-readable storage medium storing instructions which, when executed by a processing system including at least one processor, cause the processing system to perform operations, the operations comprising:

a documentation file comprising information regarding a use of a machine learning model, wherein the documentation file comprises a byte array, wherein the documentation file includes a delimiter indicator that is embedded, wherein the delimiter indicator is in a file position that is after an end-of-file indicator of the documentation file, wherein the end-of-file indicator indicates an end of a documentation file content, wherein the end-of-file indicator is in an intermediate position in the byte array, wherein the machine learning model is embedded in the documentation file, wherein the machine learning model is in a serialized format, and wherein the machine learning model is in a file position of the documentation file that is after the delimiter indicator;

determining the file position of the delimiter indicator;

extracting the machine learning model in the serialized format from the documentation file in accordance with the delimiter indicator; and storing the machine learning model that is extracted in a separate file from the documentation file.

18. The non-transitory computer-readable storage medium of claim 17, wherein the machine learning model comprises:

a trained machine learning model; or an untrained machine learning model.

19. The non-transitory computer-readable storage medium of claim 18, wherein the machine learning model comprises the untrained machine learning model, the method further comprising:

training the untrained machine learning model in accordance with a set of input data to create a newly trained machine learning model; and storing the newly trained machine learning model.

20. The non-transitory computer-readable storage medium of claim 17, wherein the delimiter indicator is a byte sequence that is associated with a text code.

* * * * *